United States Patent [19]

Pletscher

[11] 4,117,962

[45] Oct. 3, 1978

[54] BICYCLE LUGGAGE CARRIER EQUIPPED WITH RECOGNITION AND SAFETY DEVICE

[75] Inventor: Oskar Pletscher, Marthalen, Switzerland

[73] Assignee: Gebruder Pletscher, Marthalen, Switzerland

[21] Appl. No.: 754,406

[22] Filed: Dec. 26, 1976

[30] Foreign Application Priority Data

Jan. 16, 1976 [AT] Austria ................................. 273/76

[51] Int. Cl.$^2$ ............................................. B62J 5/20
[52] U.S. Cl. ........................................ 224/31; 224/37; 350/97
[58] Field of Search ............... 224/39 R, 37, 38, 32 A, 224/32 R, 31, 30 R; 350/97, 99, 100; 116/28 R, 31; 240/7.55, 8.3, 58; 280/289 R, 289 A

[56] References Cited

U.S. PATENT DOCUMENTS

| | | | |
|---|---|---|---|
| 1,892,860 | 1/1933 | Wehr et al. | 350/97 |
| 2,809,053 | 10/1957 | Pletscher | 224/39 R X |
| 3,082,041 | 3/1963 | Hamilton | 350/99 X |
| 3,684,347 | 8/1972 | Challe et al. | 350/97 |
| 3,800,623 | 4/1974 | Baginski | 350/99 X |

FOREIGN PATENT DOCUMENTS

| | | | |
|---|---|---|---|
| 1,388,065 | 12/1964 | France | 224/37 |
| 1,181,781 | 2/1970 | United Kingdom | 224/31 |

*Primary Examiner*—Trygve M. Blix
*Assistant Examiner*—Jerold M. Forsberg
*Attorney, Agent, or Firm*—Werner W. Kleeman

[57] ABSTRACT

A bicycle luggage carrier equipped with a recognition and safety device, comprising a holder bracket hingedly connected to the rear end of a frame and loaded by a spring arranged at the region of the hinge connection, and a support plate facing towards the rear for carrying reflectors. The support plate is arranged between lateral flap members and is connected therewith into a skirt engaging about the rear end of the frame and downwardly depending therefrom.

7 Claims, 3 Drawing Figures

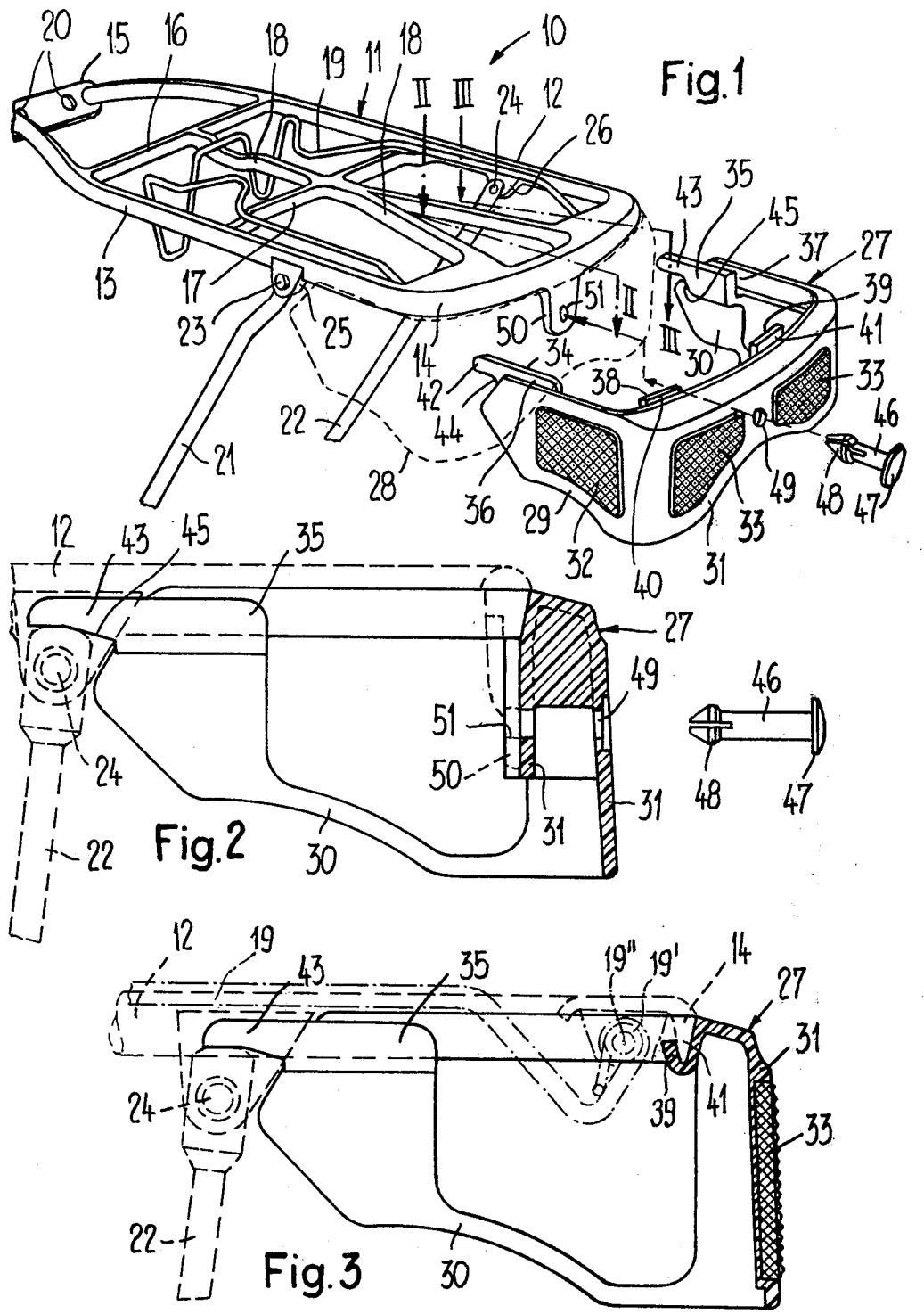

BICYCLE LUGGAGE CARRIER EQUIPPED WITH RECOGNITION AND SAFETY DEVICE

BACKGROUND OF THE INVENTION

The present invention relates to a new and improved construction of a bicycle luggage carrier equipped with a recognition and safety device, which is of the type comprising a holder bracket hingedly connected at the rear end of a frame and loaded by a spring arranged at the region of the hinge connection, and a rearwardly directed support plate structured for supporting or taking-up reflectors.

In French Pat. No. 1,388,065 there is taught such type of bicycle luggage carrier which satisfactorily complies with the prevailing traffic safety requirements, especially that the user be noticeably visible in darkness.

With the heretofore known luggage carriers the support plate — instead of the rear fender of the bicycle — equipped for supporting the reflectors, is clamped between two downwardly directed sections or support struts of the frame of the luggage carrier. At the upper end of these sections or support struts there merge two horizontal, forwardly extending side webs or struts of the frame which are interconnected by a horizontal strut. At this strut there is hingedly connected the holder bracket which is loaded by the spring.

It has been found that in the case of bicycle luggage carriers of this type, it is especially the hinge locations of the holder bracket which can constitute the cause of unpleasant side effects during use. Such side effects include, for example, disturbances in the functionality of the more or less freely accessible spring due to foreign objects which are clamped therein, whether such emanate from the luggage or other articles which are to be fixedly held or contaminants. Also, and especially one of the more unpleasant side effects is injury which can be caused by the spring during use of the bicycle equipped with the luggage carrier. This explains why recently the various regulatory agencies or authorities responsible for issuing permits for bicycles or the like have placed greater demands upon the requirements for such luggage carriers before permitting their use.

SUMMARY OF THE INVENTION

It is therefore a general object of the present invention to provide a new and improved construction of a bicycle luggage carrier equipped with a recognition and safety device which is not associated with the aforementioned drawbacks and limitations of the prior art proposals.

Another and more specific object of the present invention aims at the provision of a luggage carrier of the previously mentioned type which, practically without any greater constructional expenditure in contrast to the heretofore known luggage carriers, enables extensively avoiding the aforementioned unpleasant side effects, and thus, also enables compliance with the stricter acceptance requirements for such luggage carriers.

Now in order to implement these and still further objects of the invention which will become more readily apparent as the description proceeds, the bicycle luggage carrier of the present invention is manifested by the features that the support or carrier plate is arranged between lateral flap members and is connected therewith into a skirt surrounding the rear end of the frame and depending downwardly therefrom.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a perspective exploded view of a luggage carrier in its disassembled condition, wherein only part of the support struts have been illustrated;

FIG. 2 is an enlarged sectional view taken along the line II—II of FIG. 1, however showing the skirt of the luggage carrier in its assembled or mounted condition; and FIG. 3 is an enlarged sectional view of the arrangement of FIG. 1, taken along the line III—III thereof, again showing the skirt in its mounted condition.

DETAILED DESCRIPTION OF THE PREFERRED EMBODIMENTS

Describing now the drawings, the illustrated luggage carrier 10 will be seen to possess a frame 11 having two side brackets or struts 12 and 13 which are interconnected at their rear end by means of a substantially arc-shaped or curved end strut 14 and at their front end by a flange 15. Extending from the side struts 12 and 13 as well as the end strut 14 are the intersecting struts 16, 17 and 18, which together with the brackets or struts 12 and 13 form a support or carrier surface for the luggage or other load to be transported.

The components 11 to 18 are advantageously formed of one-piece as a die cast- or injection molded part formed of a light metal alloy. In order to support the luggage or the like there is provided a holder bracket 19, shown in FIG. 1 in its rest position, which can be rocked upwardly against the action of a spring 19' about a substantially horizontal pivot shaft 19'' (FIG. 3) arranged at the region of the end bracket or strut 14, and thus fixedly clamps the luggage.

To secure the luggage carrier 10 at the bicycle or other vehicle there is employed, on the one hand, the flange 15 which is fixedly screwed by means of bolts extending through the bores 20 at a corresponding flange provided at the frame of the bicycle and, on the other hand, two support struts 21 and 22 which are hingedly connected at one end by means of the pivot pins 23 and 24 respectively, at the eyelets 25 and 26, respectively, formed at the side struts or brackets 13 and 12 respectively, and at their other ends are anchored at an associated eyelet at two upstanding brackets of the rear wheel suspension or the steering fork (in the event that the luggage carrier is mounted at the front) of the bicycle.

Associated with the luggage carrier 10 is a skirt designated in its entirety by reference character 27, and illustrated in FIG. 1 with full lines in its dismantled condition, whereas the phantom or broken lines 28 indicate its outline in that position where it is mounted at the frame 11. This skirt 27 comprises an essentially U-shaped plastic or metal part and possesses two lateral flap members or flanges 29 and 30 which are interconnected by a slightly domed support or carrier plate 31. The side flaps or flap members 29 and 30 are each provided with a reflector or equivalent structure, wherein in FIG. 1 there is only visible the reflector 32. On the other hand, the support or carrier plate 31, as illustrated, is equipped with two reflectors 33 or the like.

At the inside of both side flap members 29 and 30 there is formed at the region of its upper edge a respective nose 34 and 35 by means of which, together with the corresponding regions of the side flap members, there is laterally limited or bounded a respective channel or groove 36 and 37 which, in turn, — in the assembled condition of the skirt — engages from below a section of the associated side strut 13 and 12 respectively.

Equally there are formed two noses or nose members 38 and 39 at the inside of the support or carrier plate 31 at the region of its upper edge. These nose members 38 and 39 in conjunction with the upper edge of the support plate 31 form a respective groove or channel 40 and 41 which, as best seen by referring to FIG. 3, engage from below a section of the end bracket or strut 14. Additionally, there is formed at the nose members 34 and 35 a forwardly protruding projection 42 and 43 respectively, each having an inclined surface 44 and 45 respectively. These projections 42 and 43, as best seen by referring to FIGS. 2 and 3, and with the skirt 27 mounted, engage over the inwardly protruding pivot pins 23 and 24 of the corresponding support struts 21, 22 or the upper ends thereof, so that there is insured that the grooves 36 and 37 in each case engage from below about the corresponding side struts 13 and 12, respectively, of the frame 11. So that the skirt 27 remains fixedly held in this position, such is secured at the frame 11 by means of a pin 46 constructed in the manner of a slotted expandable mandrel having a head 47 and an enlarged pointed front end 48. With the skirt 27 in its mounted or assembled condition, the pin 46 engages through a continuous bore 49 formed at the center of the support plate 31 and through a further bore 51 provided at the center of a flap member 50 formed at the end bracket or strut 14 and depending downwardly therefrom. Consequently, on the one hand, the support plate 31 is tightly pressed against the flap member 50 and therefore the projections 42 and 43 are held in their position engaging over the pivot pins 23, 24 and, on the other hand, the skirt 27 is prevented from tilting downwardly, i.e. the grooves 40, 41 are held in their position where they engage from below about the end strut 14. In this way there is also prevented that the skirt 27 will shift due to tension- or thrust forces which may arise. Such forces are taken-up by the nose members 38 and 39. The pin 46 thus only serves to secure the skirt 27 in its position and during use is hardly loaded by forces.

It is to be observed that no part of the skirt 27 protrudes upwardly past the support formed by the frame 11 and thus equally cannot be worn by the luggage. Furthermore, the skirt 27 forms a smooth, harmonic closure of the luggage carrier and especially a cover for the spring 19' of the holder bracket 19, so that there is no danger that the user will injure himself or herself at such spring 19'. The reflectors 33 are advantageously red, whereas the lateral or side reflectors 32, to the extent that the same are even present, may be for instance yellow. Moreover, there can be provided at the support or carrier plate 31 an additional bore for the mounting of a rear light. Instead of the pin 46 there can of course also be provided a bolt and a nut member, by means of which there can at the same time be fixedly threadably connected a license plate or the like for the bicycle.

While there are shown and described present preferred embodiments of the invention, it is to be distinctly understood that the invention is not limited thereto, but may be otherwise variously embodied and practiced within the scope of the following claims. Accordingly,

What I claim is:

1. A bicycle luggage carrier equipped with a recognition and safety device, comprising:
    a frame having a rear end portion;
    a holder bracket;
    means for hingedly connecting the holder bracket at the rear end portion of the frame;
    a spring operatively associated with the hingedly connecting means for biasing the holder bracket against the frame;
    skirt means mounted to the rear end portion of the frame and depending downwardly therefrom for mounting reflector means;
    said skirt means including a support plate and a pair of spaced lateral flap members between which there is arranged the support plate;
    said skirt means extending about the rear end portion of the frame and housing said spring to thereby provide a cover for the spring to protect a user from injury by the spring;
    said frame including side struts and a rear strut each having undersides;
    said skirt means having an inner surface provided with upwardly open channel means engaging said side struts and said rear strut of the frame from the undersides thereof.

2. A bicycle luggage carrier equipped with a recognition and safety device, comprising:
    a frame having a rear end portion and including side struts and a rear strut having undersides;
    a holder bracket;
    means for hingedly connecting the holder bracket to the rear end portion of the frame;
    a spring operatively associated with said hingedly connecting means for biasing the holder bracket against the frame;
    skirt means mounted to the rear end portion of the frame and depending downwardly therefrom for mounting reflector means;
    said skirt means further having an inner surface provided with upwardly open channel means engaging said side struts and said rear strut of the frame from the undersides thereof;
    said skirt means having an upper edge;
    nose members formed at the inner surface of the skirt means;
    said channels being bounded by the upper edge of the skirt means and said nose members.

3. The bicycle luggage carrier as defined in claim 2 wherein:
    at least some of the nose members are formed at the inner surface of the lateral flap members of the skirt means;
    a projection extending from each of the nose members formed at the lateral flap members, each projection engaging over a portion of the luggage carrier.

4. The bicycle luggage carrier as defined in claim 3, wherein:
    the projections engage over a transverse strut interconnecting the side struts of the frame.

5. The bicycle luggage carrier as defined in claim 3, wherein:
    the projections engage over a respective pivot pin of the side struts;

said pivot pins comprising said hingedly connecting means.

6. The bicycle luggage carrier as defined in claim 3, herein:
said frame of the luggage carrier is provided with a bore;
said skirt means is provided with a bore;
pin means engaging in said bore of the skirt means and said bore of the frame for securing the skirt means to said frame.

7. The bicycle luggage carrier as defined in claim 6, wherein:
said pin means comprises a slotted expandable mandrel having an enlarged and pointed end.

* * * * *